United States Patent [19]

Ukai et al.

[11] Patent Number: 4,731,793
[45] Date of Patent: Mar. 15, 1988

[54] DYE LASER

[75] Inventors: Toshinao Ukai; Hisashi Okada, both of Kanagawa, Japan

[73] Assignee: Fuji Photo Film Co., Ltd., Kanagawa, Japan

[21] Appl. No.: 883,398

[22] Filed: Jul. 8, 1986

[30] Foreign Application Priority Data

Jul. 8, 1985 [JP] Japan .................................. 60-149826
Nov. 19, 1985 [JP] Japan .................................. 60-259551

[51] Int. Cl.$^4$ ............................................. H01S 3/20
[52] U.S. Cl. .................................. 372/53; 252/301.17
[58] Field of Search ................ 372/53, 54; 252/301.17

[56] References Cited

U.S. PATENT DOCUMENTS 3,831,105  8/1974  Webster .............................. 372/53
4,453,252  6/1984  Arisawa et al. ....................... 372/54

Primary Examiner—Leon Scott, Jr.
Attorney, Agent, or Firm—Sughrue, Mion, Zinn, Macpeak & Seas

[57] ABSTRACT

A dye laser is described, comprising a cell containing a laser dye solution and a pumping energy source connected to the cell, wherein the laser dye solution contains a compound represented by formula (I):

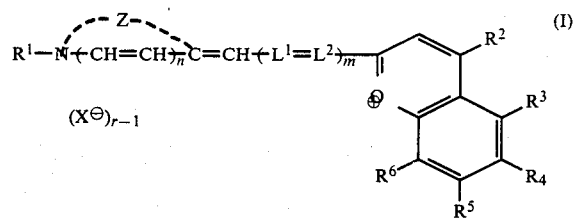

wherein n represents 0 or 1; m represents 0, 1, 2 or 3; $L^1$ and $L^2$ which may be the same or different each represents a methine or substituted methine group; $R^1$ is a substituted or unsubstituted alkyl group, an alkenyl group or an aralkyl group; $R^2$, $R^3$, $R^4$, $R^5$ and $R^6$ which may be the same or different each represents a hydrogen atom, a halogen atom, a substituted or unsubstituted alkyl group, an alkenyl group, an aryl group, an aralkyl group, an alkoxy group, an aryloxy group, an alkoxycarbonyl group, an acyloxy group, an acyl group, a hydroxy group, a cyano group, or a substituted or unsubstituted amino group; Z represents atoms necessary to form a 5- or 6-membered ring which may have a substituent or may be condensed to another ring, $X^\ominus$ represents an anion; and r represents 1 or 2, with the compound being an intramolecular salt when r is 1.

6 Claims, 3 Drawing Figures

DYE LASER

FIELD OF THE INVENTION

The present invention relates to a dye laser comprising a cell containing a solution of laser dye and a pumping energy source connected to the cell. More particularly, the present invention relates to a dye laser which emits laser light of a lasing wavelength in the range of 500 to 800 nm using as a laser active material a methine dye having both a 5- or 6-membered hetero ring and a benzopyrylium nucleus.

BACKGROUND OF THE INVENTION

A laser is a light amplifying apparatus which is capable of producing coherent monochromatic light having an excellent directivity. A dye laser belongs to the class of lasers known as liquid lasers and its basic constitution is an optical resonator including a transparent cell which contains a solution of a laser active dye and a pumping energy source which is optically coupled to the cell. In order to avoid any optical inhomogeneity, the dye solution is usually caused to circulate through a circulation system including the cell during laser operation.

The dye laser requires a pumping energy source for its operation. Sources which emit high-energy electrons or light are employed, such as discharge tubes, flash lamps, liquid lasers (e.g., dye laser), gas lasers (e.g., $N_2$ or Ar laser), metal vapor lasers (e.g., copper vapor laser), and solid lasers (e.g., Nd-YAG laser). As a result of their pumping action, the dye molecules in the dye laser are excited to higher-energy states, causing radioactive transformation. The produced light which travels along the axis of the resonator is confined within the resonator for a sufficient period of time to cause a strong interaction with the excited dye molecules.

When the number of excited molecules exceeds that of the molecules in the ground state, induction emission occurs and the light is amplified within the resonator to emit laser light.

One of the major advantages of the dye laser over solid and gas lasers is its tunability with respect to output wavelengths. That is, although the laser active dye has a certain range of fluorescent band, its output wavelengths are accurately controlled with the aid of a suitable device such as a prism or a diffraction grating.

SUMMARY OF THE INVENTION

One object of the present invention is to provide a dye laser employing a novel laser dye.

Another object of the present invention is to provide a dye laser having high conversion efficiency and stability.

These objects of the present invention can be attained by a dye laser comprising a cell containing a laser dye solution and a pumping energy source connected to the cell, wherein the laser dye solution contains a compound represented by formula (I):

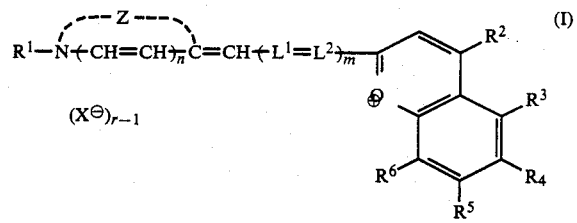

wherein n represents 0 or 1; m represents 0, 1, 2 or 3; $L^1$ and $L^2$ which may be the same or different each represents a methine or substituted methine group; $R^1$ is a substituted or unsubstituted alkyl group, an alkenyl group or an aralkyl group; $R^2$, $R^3$, $R^4$, $R^5$ and $R^6$ which may be the same or different each represents a hydrogen atom, a halogen atom, a substituted or unsubstituted alkyl group, an alkenyl group, an aryl group, an aralkyl group, an alkoxy group, an aryloxy group, an alkoxycarbonyl group, an acyloxy group, an acyl group, a hydroxy group, a cyano group, or a substituted or unsubstituted amino group; Z represents atoms necessary to form a 5- or 6-membered ring which may have a substituent or may be condensed to another ring; $X^\ominus$ represents an anion; and r represents 1 or 2, with the compound being an intramolecular salt when r is 1.

When a methine dye represented by the formula (I) which has both a 5- or 6-membered hetero ring and a benzopyrylium nucleus is contained in the laser dye solution, a dye laser having a lasing wavelength region of 500 to 800 nm is provided.

DETAILED DESCRIPTION OF THE INVENTION

Figure 1:
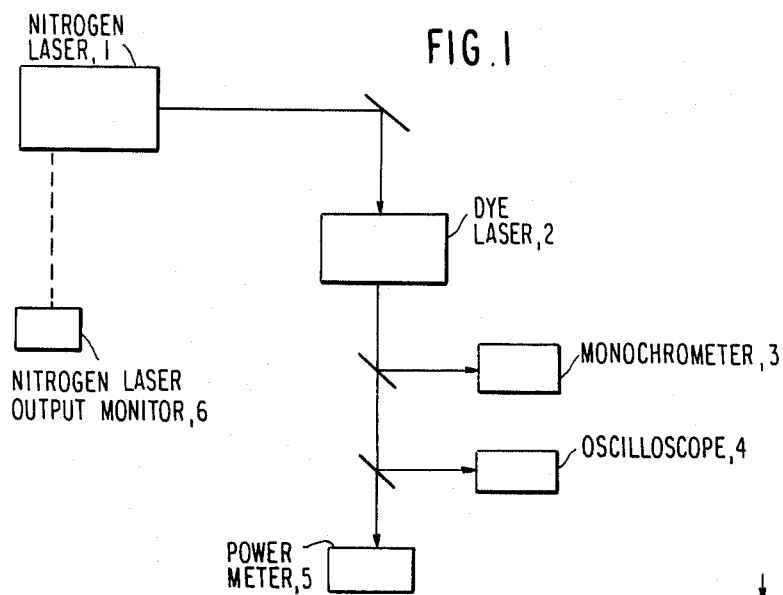
FIG. 1 is a schematic view of a dye laser according to one embodiment of the present invention, wherein 1 signifies a nitrogen laser, 2 is the dye laser, 3 is a monochrometer, 4 is an oscilloscope, 5 is a power meter, and 6 is a nitrogen laser output monitor.

The dye laser of the present invention is characterized by incorporating a compound represented by formula (I) in the dye solution. Preferred examples of the substituents in the compound of formula (I) are listed below.

Preferred examples of $R^1$ include: unsubstituted alkyl groups having not more than 18 carbon atoms, and preferably not more than 8 carbon atoms (e.g., a methyl, ethyl, propyl, butyl, pentyl, octyl, decyl, dodecyl, octadecyl, or cyclohexyl group); substituted alkyl groups

[those having not more than 18 carbon atoms, and preferably not more than 8 carbon atoms, in the alkyl moiety and which are substituted by, for example, a carboxyl group, a sulfo group, a cyano group, a halogen atom (e.g., fluorine, chlorine, or bromine), a hydroxy group, an alkoxycarbonyl group having not more than 8 carbon atoms (e.g., a methoxycarbonyl, ethoxycarbonyl, phenoxycarbonyl, or benzyloxycarbonyl group), an alkoxy group having not more than 8 carbon atoms (e.g., a methoxy, ethoxy, benzyloxy, or phenethyloxy group), a monocyclic aryloxy group having not more than 10 carbon atoms (e.g., a phenoxy, or p-tolyloxy group), an acyloxy group having not more than 3 carbon atoms (e.g., an acetyloxy, or propionyloxy group), an acyl group having not more than 8 carbon atoms (e.g., an acetyl, propionyl, benzoyl, or mesyl group), a carbamoyl group (e.g., a carbamoyl, N,N-dimethylcarbamoyl, morpholinocarbonyl, or piperidinocarbonyl group), a sulfamoyl group (e.g., a sulfamoyl, N,N-dimethylsulfamoyl, morpholinosulfonyl, or piperidinosulfonyl group), an acylamino group having not more than 8 carbon atoms (e.g., an acetylamino, propionylamino, benzoylamino, or mesylamino group), or a sulfonamido group (e.g., an ethylsulfonamido, or p-toluenesulfonamido group)]; alkenyl groups having not more than 8 carbon atoms (e.g., an allyl, or 3-butenyl group) and aralkyl groups having not more than 10 carbon atoms (e.g., a benzyl, 4-chlorobenzyl, 4-methylbenzyl, or 1-naphthylmethyl group).

Preferably, $R^1$ may combine with a benzene ring which is condensed to the 5- or 6-membered ring represented by Z to form another condensed ring (i.e., a 5- or 6-membered ring).

Preferred examples of $R^2$, $R^3$, $R^4$, $R^5$ and $R^6$ which may be the same or different from each other include a hydrogen atom, a halogen atom (e.g., fluorine or chlorine), substituted and unsubstituted alkyl groups having 1 to 12 carbon atoms (illustrative unsubstituted alkyl groups include a methyl, ethyl, propyl, butyl, hexyl, octyl, decyl, and dodecyl group, and illustrative substituted alkyl groups are those which have 1 to 18 carbon atoms, and preferably 1 to 12 carbon atoms, in their alkyl moiety and which are substituted by the substituents mentioned in connection with the substituted alkyl groups as examples of $R^1$), alkenyl groups having not more than 8 carbon atoms (e.g., an allyl or 3-butenyl group), aryl groups having not more than 10 carbon atoms (e.g., a phenyl or 4-methylphenyl group), aralkyl groups having not more than 10 carbon atoms (e.g., a benzyl, 4-chlorobenzyl, 4-methylbenzyl, or 1-naphthylmethyl group), alkoxy groups having not more than 8 carbon atoms (e.g., a methoxy, ethoxy, benzyloxy, or phenethyloxy group), monocyclic aryloxy groups having not more than 10 carbon atoms (e.g., a phenoxy or p-tolyloxy group), alkoxycarbonyl groups having not more than 8 carbon atoms (e.g., a methoxycarbonyl, ethoxycarbonyl, phenoxycarbonyl, or benzyloxycarbonyl group), acyloxy groups having not more than 3 carbon atoms (e.g., an acetyloxy or propionyloxy group), acyl groups having not more than 8 carbon atoms (e.g., an acetyl, propionyl, benzoyl, or mesyl group), a hydroxy group, a cyano group, and substituted or unsubstituted amino groups.

Particularly preferred examples of $R^5$ include substituted or unsubstituted amino groups, and a hydroxy group; the unsubstituted or substituted amino groups are represented by

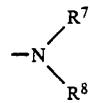

wherein $R^7$ and $R^8$ which may be the same or different from each other represent preferably a hydrogen atom, an unsubstituted alkyl group having not more than 8 carbon atoms (e.g., a methyl, ethyl, propyl or butyl group), a substituted alkyl group (which contains not more than 18 carbon atoms, and preferably not more than 8 carbon atoms, in its alkyl moiety, and which may be substituted by the substituents listed in connection with the substituted alkyl groups as examples of $R^1$), an acyl group having not more than 8 carbon atoms (e.g., an acetyl, propionyl, or benzoyl group), an alkoxycarbonyl group having not more than 8 carbon atoms (e.g., a methoxycarbonyl, ethoxycarbonyl, phenoxycarbonyl, or benzyloxycarbonyl group), or a sulfonyl group having not more than 10 carbon atoms (e.g., a methanesulfonyl group).

If desired, $R^7$ and $R^8$ may be connected to form a 5- or 6-membered ring, and it is also preferable that $R^7$ or $R^8$ is condensed to the benzene ring in the benzopyrylium ring to form a condensed ring.

Z represents the atomic group necessary to form a 5- or 6-membered ring. For example, preferred examples of the ring include: a thiazole nucleus (e.g., thiazole, 4-methylthiazole, 4-phenylthiazole, 5-methylthiazole, 5-phenylthiazole, 4,5-dimethylthiazole, 4,5-diphenylthiazole, or 4-(2-thienyl)thiazole); a benzothiazole nucleus (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5,6-dimethylbenzothiazole, 5-bromobenzothiazole, 6-bromobenzothiazole, 5-trifluoromethylbenzothiazole, 5-phenylbenzothiazole, 4-methoxybenzothiazole, 5-methoxybenzothiazole, 6-methoxybenzothiazole, 5-carboxybenzothiazole, 5-cyanobenzothiazole, 5-fluorobenzothiazole, 5-ethoxybenzothiazole, tetrahydrobenzothiazole, 5,6-dimethoxybenzothiazole, 5-hydroxybenzothiazole, or 6-hydroxybenzothiazole); a naphthothiazole nucleus (e.g., naphtho[1,2-d]thiazole, naphtho[2,1-d]thiazole, naphtho[2,3-d]thiazole, 5-methoxynaphtho[2,1-d]thiazole, 5-ethoxynaphtho[2,1-d]thiazole, 8-methoxynaphtho[1,2-d]thiazole, or 7-methoxynaphtho[1,2-d]thiazole; a thiazoline nucleus (e.g., thiazoline, 4-methylthiazoline, or 4-phenylthiazoline); an oxazole nucleus (e.g., 4-methyloxazole, 5-methyloxazole, 4-phenyloxazole, 4,5-diphenyloxazole, 4-ethyloxazole, 4,5-dimethyloxazole, or 5-phenyloxazole; a benzoxazole nucleus (e.g., benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-fluorobenzoxazole, 6-methoxybenzoxazole, 5-hydroxybenzoxazole, or 6-hydroxybenzoxazole; a naphthoxazole nucleus (e.g., naphtho[1,2-d]oxazole, naphtho[2,1-d]oxazole, or naphtho[2,3-d]oxazole); an isooxazole nucleus (e.g., 5-methylisooxazole or benzoisooxazole); an oxazoline nucleus (e.g., 4,4-dimethyloxazoline); a selenazole nucleus (e.g., 4-methylselenazole, 4-nitroselenazole, or 4-phenylselenazole); a benzoselenazole nucleus (e.g., benzoselenazole, 5-chlorobenzoselenazole, 5-nitrobenzoselenazole, 5- methoxybenzoselenazole, 5-hydroxybenzoselenazole, 6-nitrobenzoselenazole, or 5-chloro-6-nitrobenzoselenazole); a naphthoselenazole nucleus (e.g., naphtho[2,1-d]selenazole or naphtho[1,2-d]selenazole); a tellurazole nucleus (e.g., benzotellurazole, 5-methylbenzotellurazole, 5,6-dimethylbenzotellurazole, 5-methoxybenzotellurazole, 5-hydroxybenzotellurazole, 5-methylthiobenzotellurazole, 5,6-dimethoxybenzotellurazole, naphtho[1,2-d]tellurazole, 8-methylnaphtho[1,2-d]tellurazole, or 6-methoxynaphtho[1,2-d]tellurazole; a 3,3-dialkylindolenine nucleus (e.g., 3,3-dimethylindolenine, 3,3-diethylindolenine, 3,3-dimethyl-5-cyanoindolenine, 3,3-dimethyl-6-nitroindolenine, 3,3-dimethyl-5-nitroindolenine, 3,3-dimethyl-5-methoxyindolenine, 3,3,5-trimethylindolenine, or 3,3-dimethyl-5-chloroindolenine; an imidazole nucleus {e.g., 1-alkylimidazole, 1-alkyl-4-phenylimidazole, 1-alkylbenzoimidazole, 1-alkyl-5-chlorobenzoimidazole, 1-alkyl-5,6-dichlorobenzoimidazole, 1-alkyl-5-methoxybenzoimidazole, 1-alkyl-5-cyanobenzoimidazole, 1-alkyl-5-fluorobenzoimidazole, 1-alkyl-5-trifluoromethylbenzoimidazole, 1-alkyl-6-chloro-5-cyanobenzoimidazole, 1-alkyl-6-chloro-5-trifluoromethylbenzoimidazole, 1-alkylnaphtho[1,2-d]imidazole, 1-allyl-5,6-dichlorobenzoimidazole, 1-allyl-5-chlorobenzoimidazole, 1-arylimidazole, 1-arylbenzoimidazole, 1-aryl-5-chlorobenzoimidazole, 1-aryl-5,6-dichlorobenzoimidazole, 1-aryl-5-methoxybenzoimidazole, 1-aryl-5-cyanobenzoimidazole, or 1-arylnaphtho[1,2-d]imidazole; the above-described alkyl substituent includes one having 1 to 8 carbon atoms, perferably such as an unsubstituted alkyl group (e.g., methyl, ethyl, propyl, isopropyl, or butyl group) or a hydroxyalkyl group (e.g., 2-hydroxyethyl or 3-hydroxypropyl group), with methyl group and ethyl group being particularly preferable; the above-described aryl substituent includes a phenyl, a halogen (e.g., chloro) substituted phenyl, an alkyl (e.g., methyl substituted phenyl) or an alkoxy (e.g., methoxy) substituted phenyl}; a pyridine nucleus (e.g., 2-pyridine, 4-pyridine, 5-methyl-2-pyridine, or 3-methyl-4-pyridine); a quinoline nucleus (e.g., 2-quinoline, 3-methyl-2-quinoline, 5-ethyl-2-quinoline, 6-methyl-2-quinoline, 6-nitro-2-quinoline, 8-fluoro-2-quinoline, 6-methoxy-2-quinoline, 6-hydroxy-2-quinoline, 8-chloro-2-quinoline, 4-quinoline, 6-ethoxy-4-quinoline, 6-nitro-4-quinoline, 8-chloro-4-quinoline, 8-fluoro-4-quinoline, 8-methyl-4-quinoline, 8-methoxy-4-quinoline, isoquinoline, 6-nitro-1-isoquinoline, 3,4-dihydro-1-isoquinoline, or 6-nitro-3-isoquinoline); an imidazo[4,5-b]quinoxaline nucleus (e.g., 1,3-diethylimidazo[4,5-b]quinoxaline, or 6-chloro-1,3-diallylimidazo[4,5-b]quinoxaline; an oxdiazole nucleus; a thiadiazole nucleus; a tetrazole nucleus; and a pyrimidine nucleus. Among these, particularly preferred examples of the ring include a benzothiazole nucleus, a naphthothiazole nucleus, a benzoxazole nucleus, a naphthoxazole nucleus, a benzoselenazole nucleus, a naphthoselenazole nucleus, a 3,3-dialkylindolenine nucleus, a pyridine nucleus, and a quinoline nucleus.

$L^1$ and $L^2$ represent a methine or a substituted methine group. The substituted methine group is preferably substituted by an alkyl group having preferably 8 or less carbon atoms (e.g., a methyl or ethyl group), an aryl group having preferably 10 or less carbon atoms (e.g., a phenyl group), an aralkyl group having preferably 18 or less carbon atoms (e.g., a benzyl group), a halogen atom (e.g., a chlorine or bromine) or an alkoxy group having preferably 8 or less carbon atoms (e.g., a methoxy or ethoxy group). The substituents in the methine group may connect together to form a 4-, 5- or 6-membered ring.

$X^\ominus$ represents an anion such as a halide ion (e.g., $Cl^\ominus$, $Br^\ominus$, or $I^\ominus$), a sulfonate ion (e.g., trifluoromethane sulfonate, paratoluene sulfonate, benzenesulfonate, or parachlorobenzenesulfonate), a sulfate ion (e.g., ethyl sulfate or methyl sulfate), a perchlorate ion, or a tetrafluoroborate ion.

Typical examples of the compound represented by formula (I) are shown below although the present invention is not limited thereto.

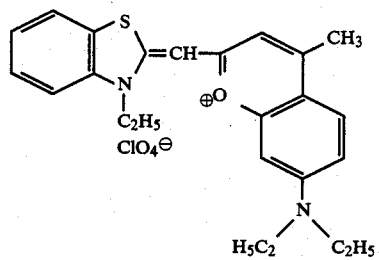

Compound 1

Compound 2

Compound 3

Compound 4

Compound 5

Compound 6

-continued
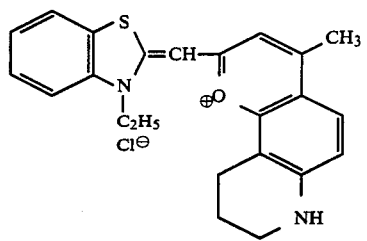
Compound 7
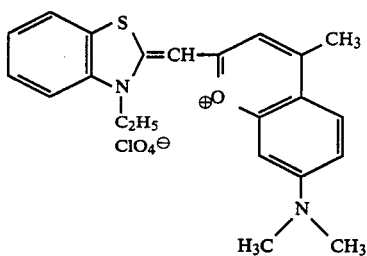
Compound 8
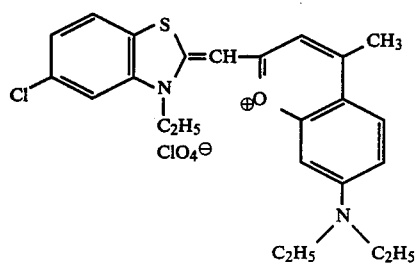
Compound 9
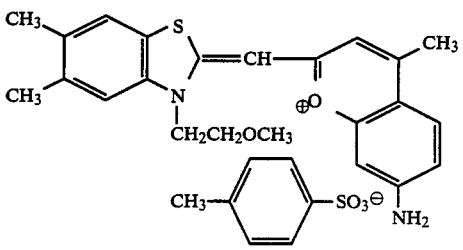
Compound 10
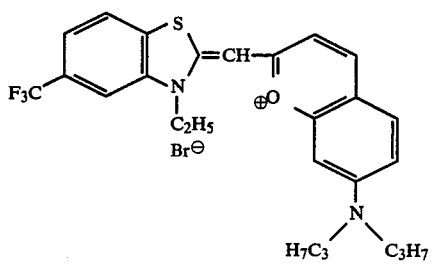
Compound 11
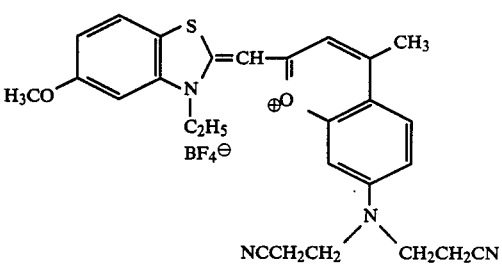
Compound 12
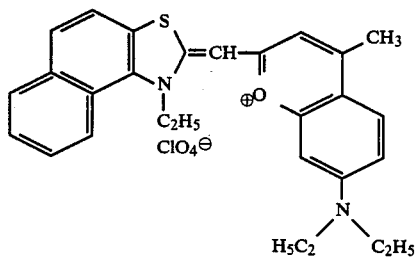
Compound 13
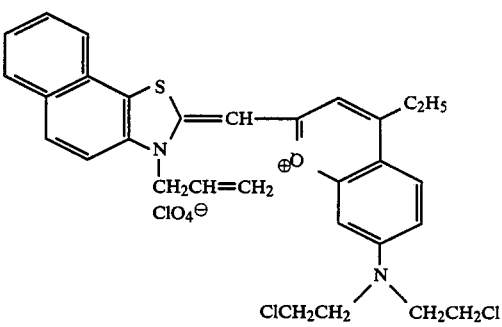
Compound 14
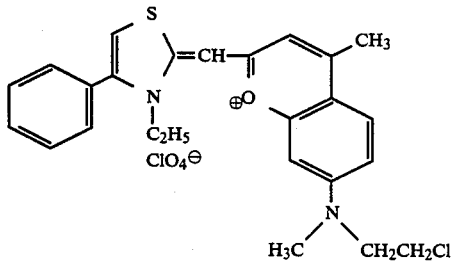
Compound 15
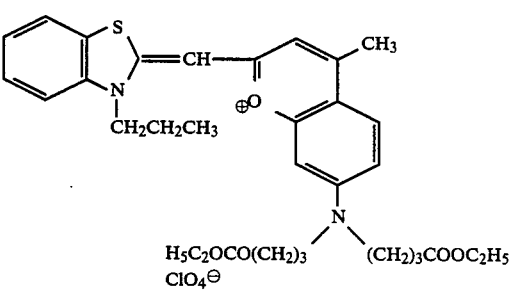
Compound 16

-continued
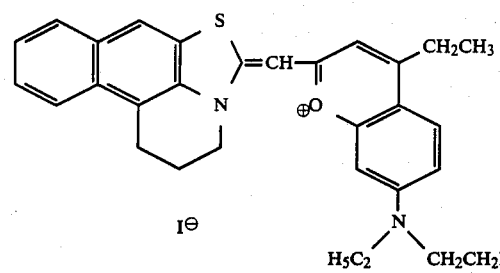
Compound 17
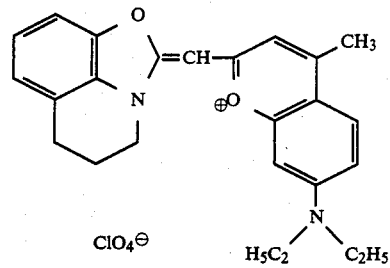
Compound 18
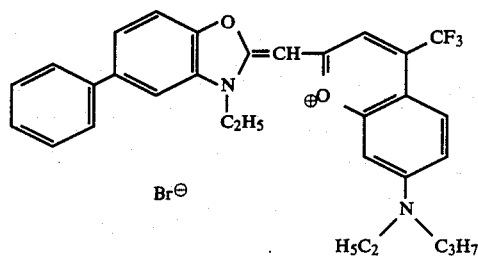
Compound 19
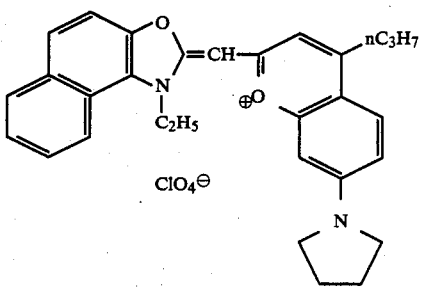
Compound 20
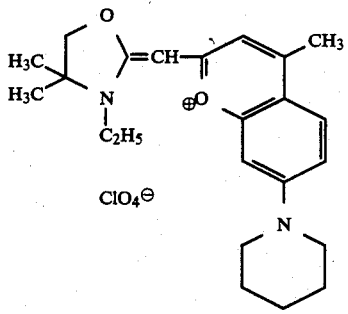
Compound 21
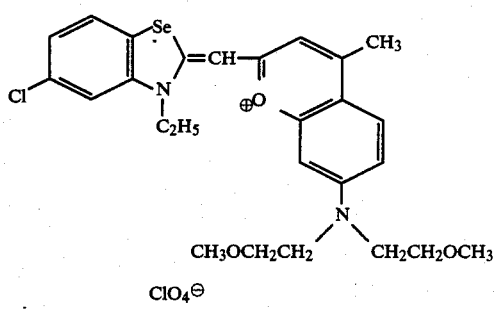
Compound 22
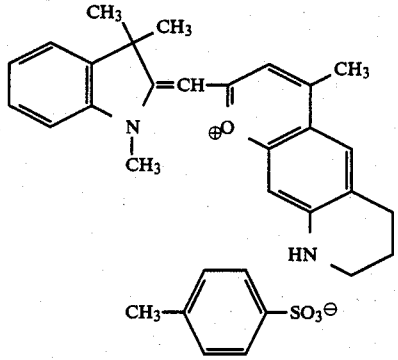
Compound 23
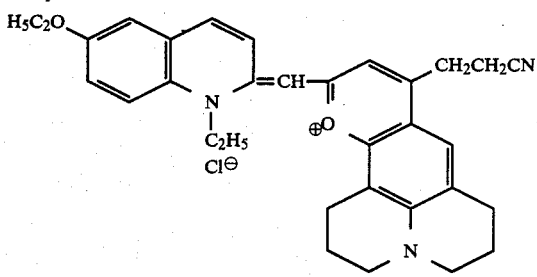
Compound 24
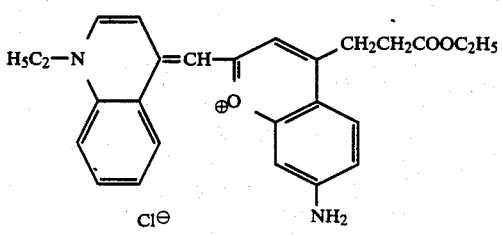
Compound 25
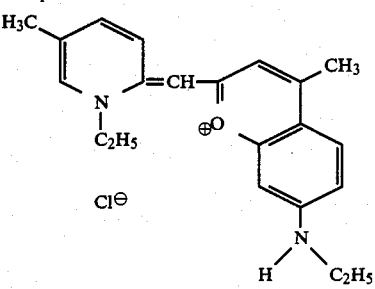
Compound 26

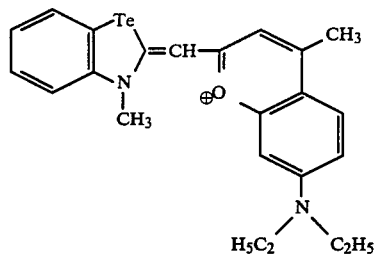
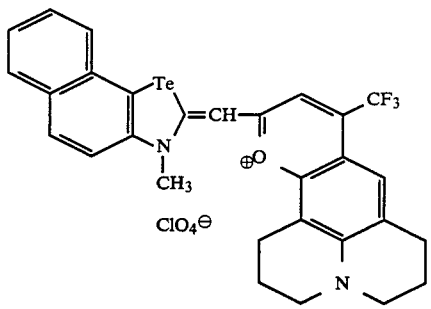
Compound 27
Compound 28
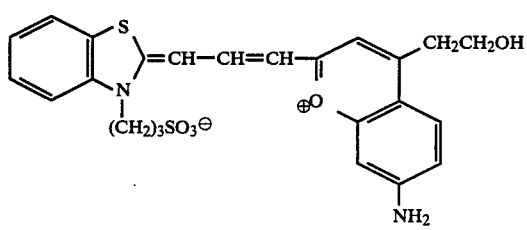
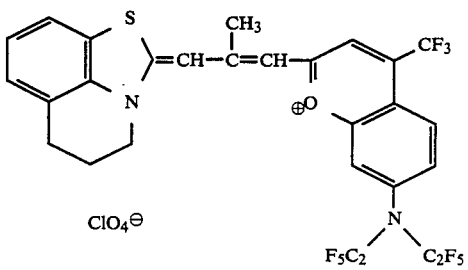
Compound 29
Compound 30
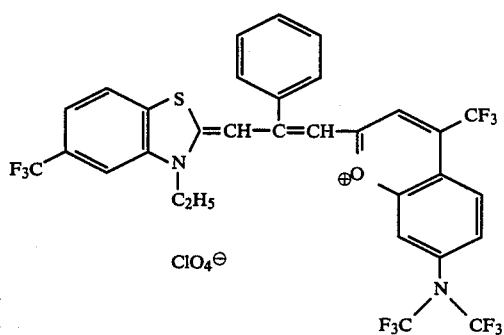
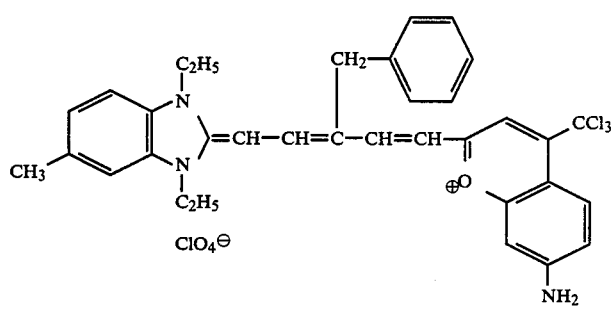
Compound 31
Compound 32
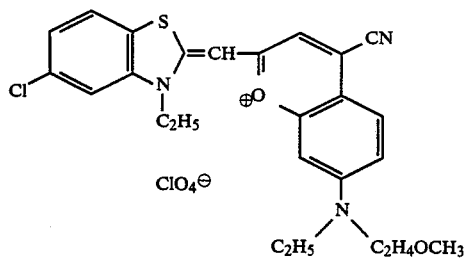
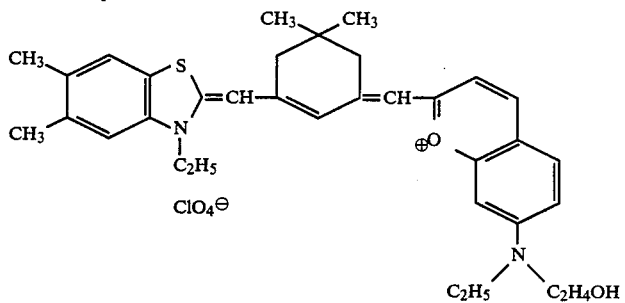
Compound 33
Compound 34
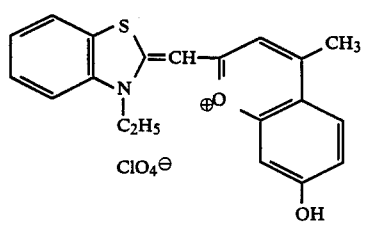
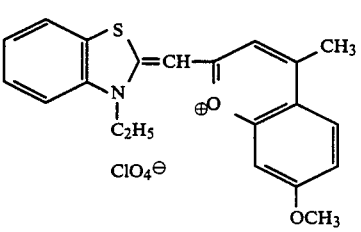
Compound 35
Compound 36

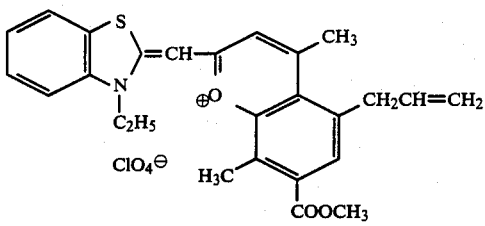

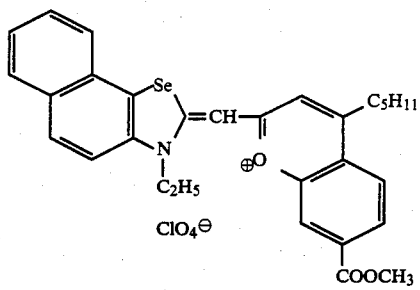

Compound 37

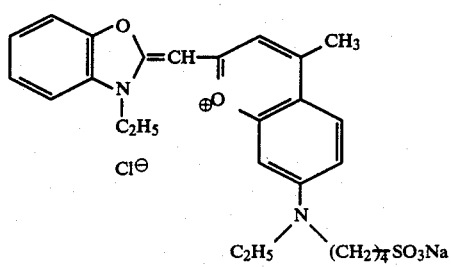

Compound 38

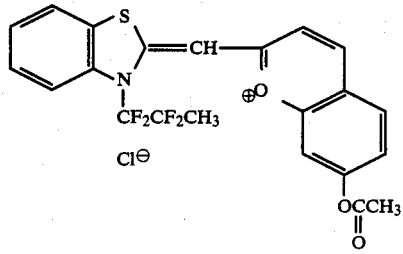

Compound 39

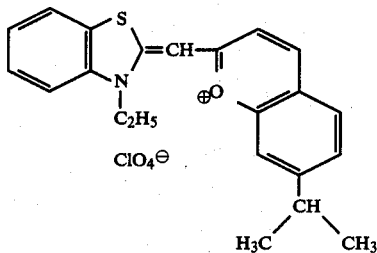

The compounds represented by formula (I) may be synthesized by various methods, and for example, they may be synthesized by a condensation reaction between heterocyclic quaternary salt derivatives having an active methyl group and 2H-chromene-2-thione derivatives in accordance with scheme (1) shown below.

Reaction scheme (1):

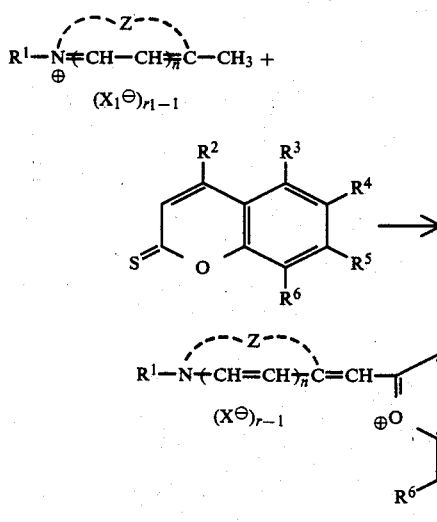

The compounds represented by formula (I) may be synthesized by a method represented by scheme (2) shown below.

Reaction scheme (2):

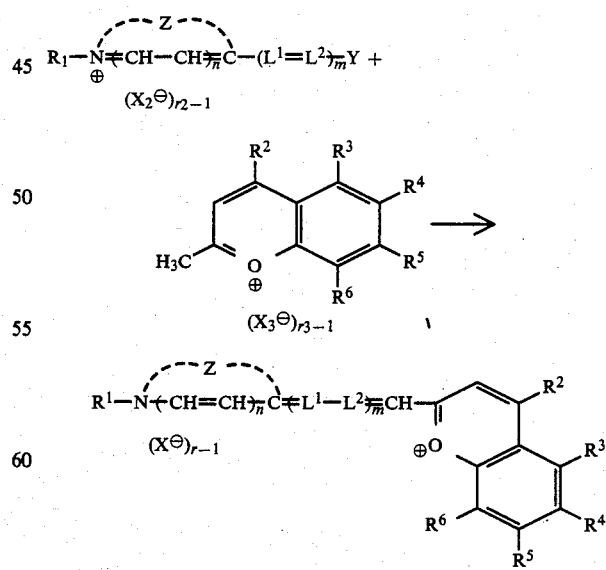

In reaction schemes (1) and (2), $R^1$, $R^2$, $R^3$, $R^4$, $R^5$, $R^6$, Z, m, n, and r have the same meanings as defined in formula (I); $X_1^\ominus$, $X_2^\ominus$ and $X_3^\ominus$ are each an anion; $r_1$, $r_2$ and $r_3$ are each 1 or 2, and $r_1$, $r_2$, and $r_3$ are 1, when the compound forms an intramolecular salt; Y is a releasing group which is commonly used in dye syntheses and may be illustrated by a halogen atom (e.g., chlorine), a formyl group, a substituted mercapto group (e.g., a methylthio, ethylthio, 3-sulfopropylthio or 4-sulfobutylthio group), a sulfonate group, and an alkoxy group (e.g., a methoxy, ethoxy or phenoxy group).

Other methods that may be employed to synthesize the compounds represented by formula (I) are described in Research Disclosure, pp. 29–32, Vol. 163, RD No. 16325 (November 1977) and the Examples given in the specification of Japanese Patent Application No. 258981/84.

The methine dye represented by formula (I) which has both a 5- or 6-membered heterocyclic ring and a benzopyrylium nucleus is incorporated in the dye solution employed as the active medium for the dye laser of the present invention, and the concentration of the compound is preferably from $1 \times 10^{-1}$ to $1 \times 10^{-6}$ mol/l, and particularly preferably from $1 \times 10^{-2}$ to $1 \times 10^{-4}$ mol/l. But when Nd:YAG laser is used as a pumping energy source, the concentration of the methine dye in a cell for an amplifier is preferably from $1 \times 10^{-3}$ to $1 \times 10^{-5}$ mol/l.

Water and a variety of organic solvents may be used as solvents for the dye solution. Advantageous examples include: monohydric alcohols such as methanol, ethanol, isopropanol and butanol; polyhydric alcohols such as ethylene glycol; cellosolves such as methyl cellosolve and ethyl cellosolve; cyclic ethers such as tetrahydrofuran and dioxane; aromatic hydrocarbons such as benzene, toluene and xylene; phenols such as phenol and resorcin; alicyclic hydrocarbons such as cyclohexane and decalin; ketones such as acetone, butanone-2 and cyclohexanone; esters such as ethyl acetate, diethyl malonate, ethylene glycol diacetate and diethyl carbonate; halogenoalkanes such as chloroform; fluoroalcohols such as fluoroisopropyl alcohols; sulfoxides such as dimethyl sulfoxide; N,N-dialkylcarboxylic acid amides such as N,N-dimethylformamide and N,N-dimethylacetamide; and propylene carbonate.

The following examples are given for the purpose of further illustrating the present invention and it should be understood that the invention is in no sense limited to these examples and that various modifications are possible to the extent that they will not depart from the spirit and scope of the invention.

Further, cyclodextrins, surface active agents or other non-surface active agents (as described in Japanese Patent Publication No. 89359/80), and the like can be used in combination in order to improve the fastness to light and obtain high resonant efficiency.

Methods for using the dye during pumping an energy source include a method adding the dye as a solution into a cell, a method circulating the dye in the cell by a circulating pump, or a jet stream method as described in Optics Letters, Vol. 9, No. 12, pp. 544–545 (December 1984).

The pumping energy sources which can be used in the present invention include discharge tubes, flash lamps, various gas lasers (e.g., $N_2$ or Ar laser), metal vapor lasers (e.g., copper vapor laser), solid laser (e.g., Nd:YAG laser), and liquid lasers (e.g., dye laser), as described above.

The methods for pumping are described in Humio Inaba and Koichi Shimoda et al, *Laser Handbook*, Asakura Shoten, pp. 223–225 (1973), Laser Gakkai editor, *Laser Handbook*, Omu Sha, pp. 225–256 (1982), etc., in detail.

The dye laser equipments are described in Mikiro Katayama editor, *Laser Kagaku (I)-Kiso and Laser (Laser Chemistry (I)-Fundamentals and Laser)*, Shokabo, pp. 203–208 (1985), Laser Gakkai editor, *Laser Handbook*, Omu Sha, pp. 261–263 (1982), etc.

Examples of the commercial dye laser equipments which are incorporated with the above are shown below.

---

375B type dye laser (manufactured by Spectra Physics Co., Ltd.)
376B type dye laser (manufactured by Spectra Physics Co., Ltd.)
380 type ring dye laser (manufactured by Spectra Physics Co., Ltd.)
Synchronized pump mode lock dye laser (manufactured by Spectra Physics Co., Ltd.)
PDL dye laser (manufactured by Quanta-Ray Co., Ltd.)
PDL-IE dye laser (manufactured by Quanta-Ray Co., Ltd.)
FL 2001 E (manufactured by Lambda Physik Co., Ltd.)
FL 2002 (manufactured by Lambda Physik Co., Ltd.)
FL 2002 E (manufactured by Lambda Physik Co., Ltd.)
FL 2002 EC (manufactured by Lambda Physik Co., Ltd.)

---

EXAMPLE 1

The results of tests due to excitation by a nitrogen laser light, in which the several compounds represented by formula (I) are used as components in the dye solution are shown in Table 1, The lasing wavelength region is a wavelength range that the output is detected by an output monitor (i.e., "Output Monitor 210" manufactured by COHERENT Co., Ltd.) or a power meter when the lasing wavelength is varied by a diffraction grating.

The tests were conducted with the dye solution being charged into a quartz cell and a nitrogen laser used as pumping energy source.

Figure 2:
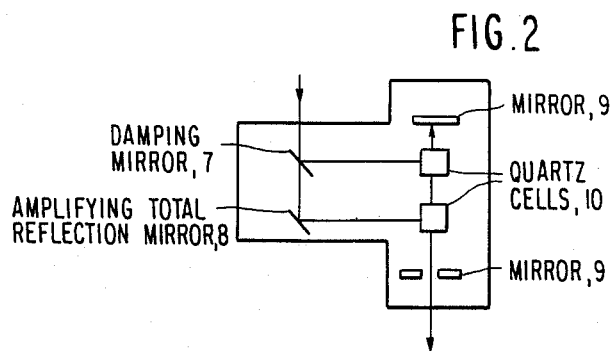
FIG. 2 shows the detail drawing of the dye laser ("DL-12" manufactured by Molectron Co., Ltd.) using a nitrogen laser ("UV-24" manufactured by Molectron Co., Ltd.) as an exciting light source corresponding to the dye laser 2 in FIG. 1 which includes a damping mirror 7, an amplifying total reflection mirror 8, two mirrors 9, and two quartz cells 10.

The layout of the test equipment is shown in FIG. 1 and FIG. 2 (corresponding to the dye laser 2 in FIG. 1). The laser resonant characteristics (e.g., lasing wavelength region) of the above dye were measured by the test equipment.

TABLE 1

(pump laser: $N_2$ laser, 337 nm)

| No. | Compound No. | Solvent | Concentration (mol/L) | Number of resonant pulse per second of exciting light source (pps) | Lasing wavelength (nm) |
|---|---|---|---|---|---|
| 1 | Compound-1 | methanol | $3.0 \times 10^{-4}$ | 19 | 601–614 |
| 2 | " | " | " | 46 | 598–618 |
| 3 | " | " | $8.2 \times 10^{-4}$ | 8 | 602–622 |
| 4 | " | " | " | 19 | 600–628 |
| 5 | " | " | " | 46 | 599–631 |
| 6 | Compound-2 | " | $8.1 \times 10^{-4}$ | 8 | 591–615 |
| 7 | " | " | " | 19 | 588–618 |

TABLE 1-continued (pump laser: $N_2$ laser, 337 nm)

| No. | Compound No. | Solvent | Concentration (mol/L) | Number of resonant pulse per second of exciting light source (pps) | Lasing wavelength (nm) |
|---|---|---|---|---|---|
| 8 | " | " | " | 46 | 587–621 |
| 9 | Compound-3 | propylene carbonate | $1.1 \times 10^{-3}$ | 19 | 582–595 |
| 10 | " | " | " | 46 | 580–599 |
| 11 | Compound-4 | methanol | $8.1 \times 10^{-4}$ | 19 | 610–638 |
| 12 | " | " | " | 46 | 698–641 |
| 13 | Compound-7 | " | " | 8 | 607–635 |
| 14 | " | " | " | 19 | 606–638 |
| 15 | " | " | " | 46 | 605–640 |
| 16 | Compound 7 | methanol/propylene carbonate (vol. ratio: 1/9) | $8.1 \times 10^{-4}$ | 8 | 615–647 |
| 17 | " | methanol/propylene carbonate (vol. ratio: 1/9) | " | 19 | 614–649 |
| 18 | " | methanol/propylene carbonate (vol. ratio: 1/9) | " | 46 | 613–652 |
| 19 | " | propylene carbonate | " | 8 | 612–654 |
| 20 | " | " | " | 19 | 611–651 |
| 21 | " | " | " | 46 | 611–659 |
| 22 | " | dimethyl sulfoxide | " | 8 | 618–661 |
| 23 | " | " | " | 19 | 617–664 |
| 24 | " | " | " | 46 | 617–665 |
| 25 | Compound-11 | methanol/propylene carbonate (vol. ratio: 1/9) | " | 8 | 618–653 |
| 26 | " | methanol/propylene carbonate (vol. ratio: 1/9) | " | 19 | 616–661 |
| 27 | " | methanol/propylene carbonate (vol. ratio: 1/9) | " | 46 | 615–664 |
| 28 | Compound 11 | propylene carbonate | $8.1 \times 10^{-4}$ | 8 | 621–651 |
| 29 | " | " | " | 19 | 619–655 |
| 30 | " | " | " | 46 | 618–658 |
| 31 | " | dimethyl sulfoxide | " | 8 | 626–655 |
| 32 | " | " | " | 19 | 623–664 |
| 33 | " | " | " | 46 | 622–668 |
| 34 | Compound-20 | methanol | " | 8 | 615–629 |
| 35 | " | " | " | 19 | 613–631 |
| 36 | " | " | " | 46 | 612–631 |
| 37 | Compound-25 | " | " | 8 | 617–630 |
| 38 | " | " | " | 19 | 615–632 |
| 39 | " | " | " | 46 | 615–633 |
| 40 | Compound-33 | methanol/triethylamine (vol. ratio: 1/9) | $8.0 \times 10^{-4}$ | 19 | 597–623 |
| 41 | Compound-33 | methanol/triethylamine (vol. ratio: 8/2) | $8.1 \times 10^{-4}$ | 19 | 599–626 |
| 42 | " | methanol/triethylamine (vol. ratio: 5/2) | " | 19 | 608–635 |
| 43 | Rhodamine 6G* (Comparison) | methanol | $8.2 \times 10^{-4}$ | 8 | 563–574 |
| 44 | Rhodamine 6G* (Comparison) | " | " | 19 | 561–579 |
| 45 | Rhodamine 6G* (Comparison) | " | " | 46 | 561–581 |

Note:
*Rhodamine 6G (Comparative Compound)

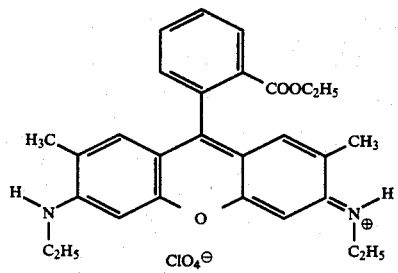

In Table 1, when two kinds of solvents were used in combination, the ratio of solvents used is shown by the volume ratio.

It is clearly seen from the results in Table 1 that the compound of the present invention can obtain wider lasing wavelength region than a comparative compound.

EXAMPLE 2

The results of tests due to excitation by a Nd:YAG laser secondary higher harmonics, in which the several compounds represented by formula (I) are used as components in the dye solution are shown in Table 2. The lasing wavelength region is a wavelength range that the output is detected by an output monitor (i.e., "Output Monitor 210" manufactured by COHERENT Co., Ltd.) or a power meter when the lasing wavelength is varied by a diffraction grating.

The tests were conducted with the dye solution being circulated in a quartz cell by a circulating pump and a Nd:YAG laser secondary higher harmonics used as pumping energy source.

Figure 3:
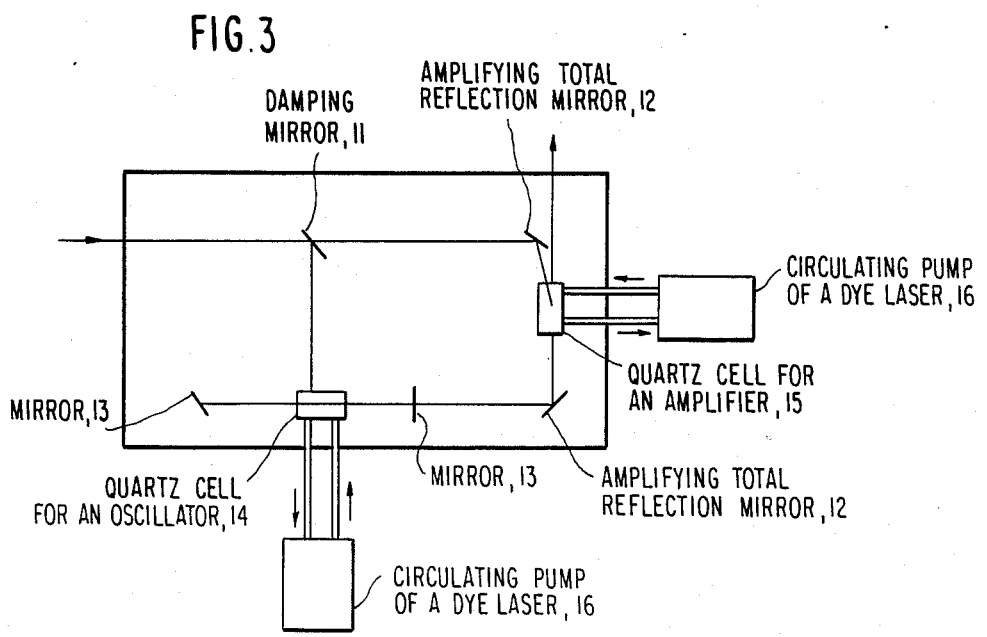
FIG. 3 shows the detail drawing of the dye laser ("PDL-2" manufactured by Quanta-Ray Co., Ltd.) using a Nd-YAG laser ("DCR-2A (10)" manufactured by Quanta-Ray Co., Ltd.) as an exciting light source corresponding to the dye laser 2 in FIG. 1 which includes a damping mirror 11, two amplifying total reflection mirrors 12, two mirrors 13, a quartz cell for an oscillator 14, a quartz cell for an amplifier 15, and two circulating pumps of a dye laser 16.

The layout of the test equipment is shown in FIG. 1 and FIG. 3 (corresponding to the dye laser 2 in FIG. 1). The laser resonant characteristics (e.g., lasing wavelength region) of the above dye were measured by the test equipment.

TABLE 2

| | | | (pump laser: Nd:YAG laser second high harmonics) | | | |
|---|---|---|---|---|---|---|
| | | | Concentration (mol/L) | | Number of resonant pulse per second of exciting light source (pps) | Lasing wavelength (nm) |
| No. | Compound No. | Solvent | Solution for Oscillator | Solution for Amplifier | | |
| 46 | Compound-1 | methanol propylene carbonate (vol. ratio: 5/1) | $1.70 \times 10^{-4}$ | $1.70 \times 10^{-5}$ | 10 | 582–640 |
| 47 | Compound-2 | methanol propylene carbonate (vol. ratio: 5/1) | " | " | " | 572–635 |
| 48 | Compound-3 | methanol propylene carbonate (vol. ratio: 5/1) | " | " | " | 567–618 |
| 49 | Compound-4 | methanol propylene carbonate (vol. ratio: 5/1) | " | " | " | 595–660 |
| 50 | Compound-7 | methanol propylene carbonate (vol. ratio: 5/1) | " | " | " | 590–668 |
| 51 | Compound-11 | methanol propylene carbonate (vol. ratio: 5/1) | " | " | " | 603–677 |

EXAMPLE 3

The results of durability tests due to excitation by a Nd:YAG laser secondary higher harmonics as a exciting light source (i.e., a pumping energy source), in which the several compounds represented by formula (I) are used as components in the dye solution are shown in Table 3.

The tests were conducted with the dye solution being circulated in a quartz cell by a circulating pump and a Nd:YAG laser secondary higher harmonics used as pumping energy source.

The layout of the test equipment is shown in FIG. 1 and FIG. 3 (corresponding to the dye laser 2 in FIG. 1).

As indicated by the following equation, the ratio (i.e., output power ratio) of a resonant output (E) after radiating a certain energy from an exciting light source to an initial resonant output (Eo) of each the dye laser comprising Compound 1 and Comparative dye (i.e., Rhodamin 101*) was measured.

Output power ratio (%) =

$$\frac{\text{A resonant output } (E) \text{ after radiating a certain energy}}{\text{An initial resonant output } (Eo)} \times 100$$

The results of the output power ratio are shown in Table 3 in order to evaluate a durability. The resonant outputs were measured at wavelengths (Compound 1: 620 nm; Rhodamin: 605 nm) where the resonant output of each the dye reaches to the highest point.

TABLE 3

| No. | Compound | Total Energy Iradiated (J) | Output Power Ratio $E/Eo \times 100$ (%) |
|---|---|---|---|
| 52 | Compound 1 | 0 | 100 |
| 53 | " | $2 \times 10^5$ | 90 |
| 54 | " | $4 \times 10^5$ | 60 |
| 55 | " | $6 \times 10^5$ | 38 |
| 56 | Rhodamin 101* (Comparative dye) | 0 | 100 |
| 57 | Rhodamin 101* (Comparative dye) | $2 \times 10^5$ | 75 |
| 58 | Rhodamin 101* (Comparative dye) | $4 \times 10^5$ | 42 |
| 59 | Rhodamin 101* (Comparative dye) | $6 \times 10^5$ | 20 |

Note:
(1) Rhodamin 101*

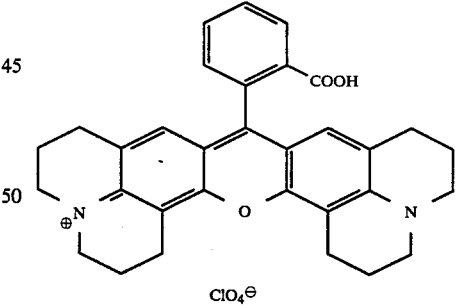

(2) Dye concentration:

| | Dye concentration | |
|---|---|---|
| | A cell for an oscillator | A cell for an amplifier |
| Compound 1 | $4.00 \times 10^{-4}$ mol/l | $4.00 \times 10^{-5}$ mol/l |
| Rhodamine 101 | $2.40 \times 10^{-4}$ mol/l | $3.55 \times 10^{-5}$ mol/l |

Solvent: Methanol/Propylenecarbonate = 9/1 (vol/vol)
(3) Condition of exciting light source: SHG (Second Harmonic Generation) input: 340 mJ/pulse, 10 pps (pulse per second)

It is clearly seen from the results in Table 3 that the durability of Compound 1 in the present invention is superior to that of Comparative dye.

As is apparent from the results in the above Tables 1 to 3, a dye laser having high conversion efficiency and high stability could be obtained by incorporating in the dye solution, methine dyes represented by formula (I) which had both a 5- or 6-membered heterocyclic ring and a benzopyrylium nucleus. Further, the dye laser according to the present invention had a lasing wavelength region in the range of 500 to 800 nm, and still further the methine dye represented by formula (I) in the present invention had higher fastness and high durability in comparison with those of conventional dye lasers.

While the invention has been described in detail and with reference to specific embodiments thereof, it will be apparent to one skilled in the art that various changes and modifications can be made therein without departing from the spirit and scope thereof.

What is claimed is:

1. A dye laser comprising a cell containing a laser dye solution and a pumping energy source connected to the cell, wherein the laser dye solution contains a compound represented by formula (I):

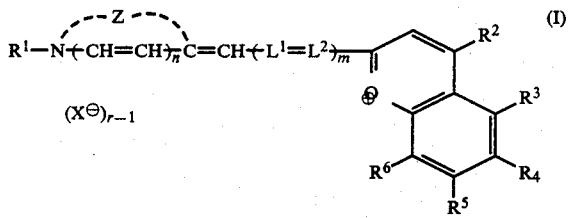

wherein n represents 0 or 1; m represents 0, 1, 2 or 3; $L^1$ and $L^2$ which may be the same or different each represents a methine or substituted methine group; $R^1$ is a substituted or unsubstituted alkyl group, an alkenyl group or an aralkyl group; $R^2$, $R^3$, $R^4$, $R^5$ and $R^6$ which may be the same or different each represents a hydrogen atom, a halogen atom, a substituted or unsubstituted alkyl group, an alkenyl group, an aryl group, an aralkyl group, an alkoxy group, an aryloxy group, an alkoxycarbonyl group, an acyloxy group, an acyl group, a hydroxy group, a cyano group, or a substituted or unsubstituted amino group, with the proviso that when $R^2$ is an alkenyl group, the alkenyl group is selected from the group consisting of an allyl group and a 3-butenyl group; Z represents atoms necessary to form a 5- or 6-membered ring which may have a substituent or may be condensed to another ring, $X^-$ represents an anion; and r represents 1 or 2, with the compound being an intramolecular salt when r is 1.

2. A dye laser as claimed in claim 1, wherein a concentration of the methine dye represented by formula (I) is from $1\times10^{-1}$ to $1\times10^{-6}$ mol/l.

3. A dye laser as claimed in claim 1, wherein a concentration of the methine dye represented by formula (I) is from $1\times10^{-2}$ to $1\times10^{-4}$ mol/l.

4. A dye laser as claimed in claim 1, wherein the pumping energy source is a Nd:YAG laser or a nitrogen laser.

5. A dye laser as claimed in claim 1, wherein the pumping energy source is a Nd:YAG laser, and a concentration of the methine dye represented by formula (I) in a cell for an amplifier is from $1\times10^{-3}$ to $1\times10^{-5}$ mol/l.

6. A dye laser as claimed in claim 1, wherein $R^1$ combines with a benzene ring which is condensed to the 5- or 6-membered ring represented by Z to form another condensed ring.

* * * * *